United States Patent [19]

Doyle, Jr. et al.

[11] 3,880,873
[45] Apr. 29, 1975

[54] HERBICIDAL N(5-CHLOROTERT.BUTYL-1,3,4-THIADIAZOL-2-YL) CARBOXAMIDES

[75] Inventors: William C. Doyle, Jr., Leawood; Joel L. Kirkpatrick, Overland Park, both of Kans.

[73] Assignee: Gulf Research & Development Company, Pittsburgh, Pa.

[22] Filed: Aug. 9, 1973

[21] Appl. No.: 387,096

Related U.S. Application Data

[62] Division of Ser. No. 186,419, Oct. 4, 1971, Pat. No. 3,823,005.

[52] U.S. Cl. ........................................ 260/306.8 D
[51] Int. Cl. ............................................. C07d 91/62
[58] Field of Search ............................ 260/306.8 D

[56] References Cited
UNITED STATES PATENTS

| | | | |
|---|---|---|---|
| 3,564,002 | 2/1971 | Remers et al. | 260/306.8 D |
| 3,728,354 | 4/1973 | Rucker et al. | 260/306.8 D |

*Primary Examiner*—R. Gallagher

[57] ABSTRACT

New N-(chlorotert.butylthiadiazolyl) amides are employed to combat undesired vegetation both pre-emergently and post-emergently. Cyclopropanecarboxamides are preferred.

2 Claims, No Drawings

HERBICIDAL N(5-CHLOROTERT.BUTYL-1,3,4-THIADIAZOL-2-YL) CARBOXAMIDES

This application is a division of U.S. Ser. No. 186,419 filed Oct. 4, 1971, now U.S. Pat. No. 3,823,005.

DESCRIPTION OF THE INVENTION

We have discovered a new class of herbicidal compounds which with some variation of the selectivity and activity are useful as herbicides to combat unwanted vegetation both pre- and post-emergently, particularly in the presence of crops such as peanuts and maize. According to the present invention, one mmay combat unwanted vegetation by applying to the locus of the vegetation a herbicidally effective amount of a compound having the structural formula:

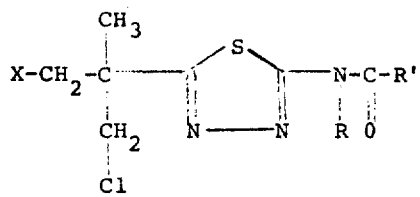

in which X represents hydrogen or a chloro substituent, R is hydrogen or a methyl or ethyl substituent and R' is selected from methyl, chloromethyl, ethyl, propyl, isopropyl, cyclopropyl, chloropropyl, and methoxymethyl substituents, preferably cyclopropyl. The novel compounds may be prepared from available starting materials according to procedures of the type specifically exemplified below.

Preparation of 2-Amino-5-(β-chloro-α,α-dimethylethyl)-1,3,4-thiadiazole

To a well stirred suspension of 150 g of thiosemicarbazide and 225 g of β-chloropivolic acid in 500 ml of dioxane heated at reflux temperature was added 262 g of phosphorus oxychloride over a 1 hr period. When the addition was complete, heating was continued until HCl evolution ceased. After cooling, the supernatant liquid was decanted from the solid mass and 500 ml of water was added. With cooling, sodium hydroxide pellets were added until a pH of 10 was maintained. The resulting precipitate was collected, washed with water and air dried to give 266 g, m.p. 174°–176° (85%). Recrystallization from methanol gave the analytical sample, m.p. 176°–177°.

Anal. Calcd. for $C_6H_{10}ClN_3S$: C, 37.60; H, 5.26; N, 21.92
Found: C, 37.67; H, 5.47; N, 22.20

Preparation of 2-Methylamino-5-α,α-bis-chloromethylethyl)-1,3,4-thiadiazole

To a stirred suspension of 34 g of 4-methylthiosemicarbazide in 150 ml of dioxane was added 60 g of bis-(2,2-chloromethyl)propionyl chloride, then heated to reflux temperature. Carefully, 50 g of phosphorus oxychloride was added and heating continued until HCl evolution ceased. After cooling, the supernatant liquid was decanted from the viscous material that had separated, water was added and the mixture taken to a pH of 10 with sodium hydroxide pellets. No precipitate formed. The solution was extracted with $CHCl_3$ which was shaken with water, saturated sodium chloride and dried over $Na_2SO_4$. The $CHCl_3$ was removed at reduced pressure and the residue crystallized with a mixture of $CH_2Cl_2$-petroleum ether to give 27.8 g, m.p. 105°–107° (36%). An analytical sample, m.p. 108°–109°, was prepared from $CH_2$-$Cl_2$-petroleum ether Anal. Calcd. for $C_7H_{11}Cl_2N_3S$: C, 35.01; H, 4.62; N, 17.50
Found: C, 35.31; H, 4.80; N, 17.66

Preparation of 2-Isobutyrylamido-5-(β-chloro-α,α-dimethylethyl)-1,3,4-thiadiazole To 6.0 g of 2-amino-5-(β-chloro-α,α-dimethylethyl)-1,3,4-thiadiazole in 25 ml of pyridine, was added 6.0 g of isobutyryl chloride at room temperature. The reaction was allowed to stir for 3 hours, then was poured into ice water. The resulting solid was collected, washed with water and air dried to give 6.5 g m.p. 129°–131° (81%). An analytical sample was prepared from $CH_2Cl_2$-petroleum ether, m.p. 132°–133°.

Anal. Calcd. for $C_{10}H_{16}ClN_3OS$: C, 45.88; H, 6.16; N, 16.05
Found: C, 46.14; H, 6.20; N, 16.23

TABLE I

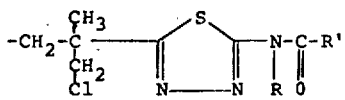

| | | | M.P. | Calcd. | | | Found | | |
|---|---|---|---|---|---|---|---|---|---|
| X | R | R' | °C | C | H | N | C | H | N |
| H | H | Cyclopropyl | 137–138 | 46.24 | 5.43 | 16.18 | 46.03 | 5.43 | 16.03 |
| H | H | CH(CH₃)₂ | 132–133 | 45.88 | 6.16 | 16.05 | 46.14 | 6.20 | 16.23 |
| H | H | CH₂CH₂CH₃ | 134–136 | 45.88 | 6.16 | 16.05 | 45.06 | 6.04 | 16.21 |
| H | H | CH₃ | 214–215 | 41.11 | 5.17 | 17.98 | 40.90 | 5.11 | 17.76 |
| H | H | (CH₂)₃Cl | 116–118 | 40.55 | 5.10 | 14.18 | 40.38 | 5.06 | 13.97 |
| H | H | —CH₂—C—CH₃ | 90–91 | 40.99 | 5.33 | 15.93 | 41.02 | 5.36 | 15.72 |
| H | CH₃ | CH(CH₃)₂ | 112–113 | 47.90 | 6.58 | 15.23 | 47.89 | 6.59 | 15.16 |
| H | CH₃ | C(CH₃)₃ | 104–105 | 49.73 | 6.95 | 14.50 | 49.51 | 6.99 | 14.37 |
| H | CH₃ | CH₂Cl | 84–85 | 38.31 | 4.64 | 14.89 | 38.31 | 4.70 | 14.93 |
| H | CH₂CH₃ | Cyclopropyl | 82–83 | 50.08 | 6.30 | 14.60 | 50.13 | 6.39 | 14.70 |
| Cl | H | Cyclopropyl | 156–157 | 40.83 | 4.45 | 14.28 | 40.86 | 4.39 | 14.07 |
| Cl | H | CH(CH₃)₂ | 176–177 | 40.55 | 5.10 | 14.18 | 40.80 | 5.06 | 14.18 |

TABLE I—Continued

| X | R | R' | M.P. °C | Calcd. C | Calcd. H | Calcd. N | Found C | Found H | Found N |
|---|---|---|---|---|---|---|---|---|---|
| Cl | H | $CH_2CH_3$ | 145–146 | 38.31 | 4.64 | 14.89 | 38.39 | 4.81 | 14.57 |
| Cl | $CH_3$ | Cyclopropyl | 104–105 | 42.86 | 4.90 | 13.63 | 43.04 | 5.02 | 13.80 |
| Cl | $CH_3$ | $CH_3$ | 120–121 | 38.31 | 4.64 | 14.89 | 38.29 | 4.75 | 14.93 |
| Cl | $CH_3$ | $CH_2CH_3$ | 100–101 | 40.55 | 5.10 | 14.18 | 40.56 | 5.22 | 14.23 |
| Cl | $CH_2CH_3$ | Cyclopropyl | 101–102 | 44.73 | 5.32 | 13.04 | 44.86 | 5.22 | 13.18 |
| Cl | $CH_2CH_3$ | $CH_2CH_3$ | 139–140 | 42.59 | 5.52 | 13.54 | 42.68 | 5.50 | 13.55 |

COMBATING UNWANTED VEGETATION

The novel herbicides are effective when used both post- and pre-emergently. There is described below an illustrative procedure for herbicidal use of the compounds under controlled conditions in the greenhouse so as to obtain data on phytotoxic activity and selectivity.

1. Post-Emergent Use

An aqueous dispersion of each active compound was prepared by combining 0.4 gram of the compound wth about 4 ml of a solvent-emulsifier mixture (3 parts of a commercial polyoxyethylated vegetable oil emulsifier, 1 part xylene, 1 part kerosene) and then adding water, with stirring, to a final volume of 40 ml.

The species of plants on which each compound was to be tested were planted in 4-inch pots in a greenhouse. Ten to 18 days after emergence of the plants, three pots of each species were sprayed with an aqueous dispersion of the active compound prepared as described above, at a rate of 5 lb of active compound per acre and at a spray volume of 60 gallons per acre. Approximately 1 week after the spray application the plants were observed and the results rated according to the following schedule.

DEGREE OF EFFECT

0 = no effect
1 = slight effect
2 = moderate effect
3 = severe effect
4 = maximum effect (all plants died)

The same rating schedule was employed to judge pre-emergent results obtained according to the procedure below.

2. Pre-Emergent Use

A solution of each active compound was prepared by dissolving 290 mg of the compound to be tested in 200 ml of acetone. Disposable expanded polystyrene trays about 2 ½ inches deep and about 1 square foot in area were prepared and sprayed with the acetone solution at the rate of 10 lb of active chemical per acre of sprayed area and were then covered with about one-fourth inch of soil. Twenty-one days after seeding and treatment the plants were examined and herbicidal effect was rated according to the above schedule.

Both post-emergent and pre-emergent results are set forth in the following table.

TABLE II

Use of Herbicides having the Structural Formula

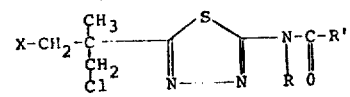

| X | R | R' | Type | Crabgrass | Coxcomb | Brome | Millet | Soybean | Cotton | Alfalfa | Oats | Corn | Flax | Radish | Sugar Beet | Wheat | Grain Sorghum | Tomato |
|---|---|---|---|---|---|---|---|---|---|---|---|---|---|---|---|---|---|---|
| H | H | Cyclopropyl | Post | | | | 4 | | | | 4 | 4 | | 4 | 4 | | | 4 |
| | | | Pre | 4 | 4 | 4 | 4 | 4 | 4 | 4 | 4 | 3 | 4 | 4 | 4 | | | |
| H | H | $C_2H_5$ | Post | | | | 4 | | | | 4 | 4 | | 4 | 4 | | | 4 |
| | | | Pre | 3 | 4 | 4 | 4 | | | | 4 | | | 4 | 4 | | | |
| H | H | -CH(CH_3)_2 | Post | | | | 4 | | | | 4 | 4 | | 4 | 4 | | | 4 |
| | | | Pre | .3 | 4 | 4 | 4 | | | | 4 | | | 4 | 4 | | | |
| H | H | $-CH_2-CH_2-CH_3$ | Post | | | | 3 | | | | 4 | 2 | | 4 | 4 | | | 4 |
| | | | Pre | 2 | 4 | 1 | 3 | | | | 4 | | | 4 | 4 | | | |
| H | H | $-CH_3$ | Post | | | | 1 | | | | 4 | 1 | | 4 | 4 | | | 4 |
| | | | Pre | 2 | 4 | 1 | 2 | | | | 4 | | | 3 | 3 | | | |
| H | H | $-CH_2-CH_2-CH_2-Cl$ | Post | | | | 2 | | | | 4 | 1 | | 3 | 3 | | | 3 |
| | | | Pre | 2 | 4 | 1 | 3 | | | | 4 | | | 4 | 4 | | | |
| H | H | $-CH_2-O-CH_3$ | Post | | | | 4 | | | | 4 | 2 | | 4 | 4 | | | 4 |
| | | | Pre | .1 | 4 | 1 | 1 | | | | 4 | | | 3 | 2 | | | |
| H | $-CH_3$ | -CH(CH_3)_2 | Post | | | | 4 | | | | 4 | 3 | | 4 | 4 | | | 4 |
| | | | Pre | 4 | 4 | 4 | 4 | | | | 4 | | | 4 | 4 | | | |
| H | $-CH_3$ | $-C(CH_3)_3$ | Post | | | | 1 | | | | 2 | 1 | | 4 | 4 | | | 3 |
| | | | Pre | 2 | 4 | 4 | 2 | | | | 4 | | | 4 | 4 | | | |
| H | $-CH_3$ | $-CH_2-Cl$ | Post | | | | 1 | | | | 1 | 0 | | 4 | 4 | | | 1 |
| | | | Pre | 4 | 4 | 4 | 4 | | | | 4 | | | 4 | 4 | | | |

TABLE II — Continued

| X | R | R' | Type | Crabgrass | Coxcomb | Brome | Millet | Soybean | Cotton | Alfalfa | Oats | Corn | Flax | Radish | Sugar Beet | Wheat | Grain Sorghum | Tomato |
|---|---|---|---|---|---|---|---|---|---|---|---|---|---|---|---|---|---|---|
| H | -CH$_3$ | Cyclopropyl | Post |  |  |  | 3 |  |  | 4 | 3 |  |  | 4 | 4 |  |  | 4 |
|   |   |   | Pre | .2 | 4 | 2 | 4 |  |  |  |  |  |  | 3 | 4 |  |  |   |
| Cl | H | Cyclopropyl | Post |  |  |  | 4 |  |  | 4 | 4 |  |  | 4 | 4 |  |  | 4 |
|   |   |   | Pre | 4 | 4 | 4 | 4 |  |  |  |  |  |  | 4 | 4 |  |  |   |
| Cl | H | -CH(CH$_3$)$_2$ | Post |  |  |  | 4 |  |  | 4 | 2 |  |  | 4 | 4 |  |  | 4 |
|   |   |   | Pre | 2 | 4 | 3 | 4 |  |  |  |  |  |  | 4 | 4 |  |  |   |
| Cl | H | C$_2$H$_5$ | Post |  |  |  | 4 |  |  | 4 | 4 |  |  | 4 | 4 |  |  | 4 |
|   |   |   | Pre | 4 | 4 | 4 | 4 |  |  |  |  |  |  | 4 | 4 |  |  |   |
| Cl | CH$_3$ | Cyclopropyl | Post |  |  |  | 4 |  |  | 4 | 4 |  |  | 4 | 4 |  |  | 4 |
|   |   |   | Pre | .4 | 4 | 4 | 4 |  |  |  |  |  |  | 4 | 4 |  |  |   |
| Cl | CH$_3$ | -CH$_3$ | Post |  |  |  | 1 |  |  | 4 | 3 |  |  | 4 | 4 |  |  | 4 |
|   |   |   | Pre | 3 | 4 | 4 | 3 |  |  |  |  |  |  | 4 | 4 |  |  |   |
| Cl | CH$_3$ | C$_2$H$_5$ | Post |  |  |  | 4 |  |  | 4 | 4 |  |  | 4 | 4 |  |  | 4 |
|   |   |   | Pre | 4 | 4 | 4 | 4 |  |  |  |  |  |  | 4 | 4 |  |  |   |
| Cl | C$_2$H$_5$ | Cyclopropyl | Post |  |  |  | 4 |  |  | 4 | 3 |  |  | 4 | 4 |  |  | 4 |
|   |   |   | Pre | 3 | 4 | 3 | 2 |  |  |  |  |  |  | 4 | 4 |  |  |   |
| Cl | C$_2$H$_5$ | C$_2$H$_5$ | Post |  |  |  | 1 |  |  | 4 | 2 |  |  | 4 | 4 |  |  | 4 |
|   |   |   | Pre | .3 | 4 | 3 | 3 |  |  |  |  |  |  | 3 | 4 |  |  |   |

Other compounds of closely related structure were also tested by the procedure described above, with results which indicate that small differences in structure may have critical effects on phytotoxicity. For example, no useful herbicidal activity was observed in compounds having the structural formula:

The preferred herbicide for use in combating unwanted vegetation according to the method of this invention is the compound having the structural formula:

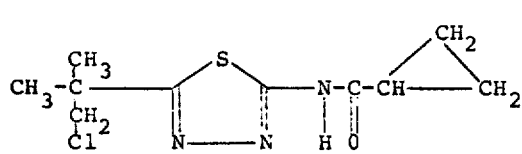

In a further test carried out in a manner similar to the procedure described above, this compound was compared with two other similar compounds on 24 species of plants. Results were scored according to the same rating schedule as above and appear below in Table III.

TABLE III

Use of Herbicides on Twenty-four Species

Compound No. 1

| Plant Species | Pre 3 lb/A | 1 lb/A | Post 3 lb/A | 1 lb/A |
|---|---|---|---|---|
| Cocklebur | 3 | 2 | 4 | 4 |
| Lambsquarter | 4 | 4 | 4 | 4 |
| Morning Glory | 4 | 4 | 4 | 4 |
| Pigweed | 4 | 4 | 4 | 4 |
| Wild Buckwheat | 4 | 3 | 4 | 4 |
| Wild Mustard | 4 | 4 | 4 | 4 |
| Barnyard Grass | 4 | 3 | 4 | 1 |
| Crabgrass | 4 | 4 | 4 | 3 |
| Downy Brome | 1 | 0 | 4 | 3 |
| Giant Foxtail | 4 | 4 | 4 | 3 |
| Green Foxtail | 4 | 3 | 4 | 3 |
| Nutsedge | 0 | 0 | 1 | 0 |
| Shattercane | 3 | 2 | 3 | 0 |
| Wild Oats | 4 | 0 | 4 | 4 |
| Alfalfa | 2 | 0 | 4 | 4 |
| Cotton | 4 | 1 | 4 | 4 |
| Peanut | 0 | 0 | 2 | 2 |
| Soybean | 4 | 4 | 4 | 4 |
| Sugar Beets | 4 | 4 | 4 | 4 |
| Tomato | 1 | 0 | 4 | 4 |
| Corn | 2 | 0 | 1 | 0 |
| Grain Sorghum | 3 | 2 | 3 | 0 |
| Rice | 4 | 2 | 3 | 2 |
| Wheat | 3 | 0 | 4 | 3 |

TABLE III

Use of Herbicides on Twenty-four Species

Compound No. 2

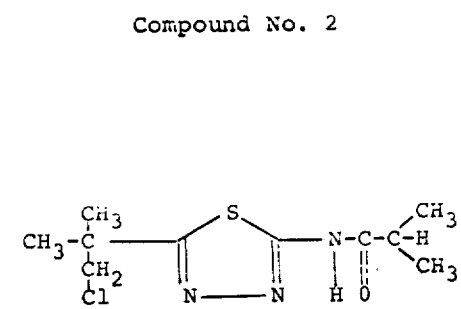

| Plant Species | Pre | | Post | |
|---|---|---|---|---|
| | 3 lb/A | 1 lb/A | 3 lb/A | 1 lb/A |
| Cocklebur | 2 | 1 | 4 | 4 |
| Lambsquarter | 4 | 4 | 4 | 4 |
| Morning Glory | 4 | 2 | 4 | 3 |
| Pigweed | 4 | 4 | 4 | 4 |
| Wild Buckwheat | 2 | 1 | 4 | 4 |
| Wild Mustard | 4 | 4 | 4 | 4 |
| Barnyard Grass | 2 | 1 | 3 | 2 |
| Crabgrass | 3 | 1 | 4 | 2 |
| Downy Brome | 3 | 0 | 4 | 2 |
| Giant Foxtail | 3 | 0 | 4 | 2 |
| Green Foxtail | 3 | 2 | 4 | 2 |
| Nutsedge | 0 | 0 | 3 | 0 |
| Shattercane | 2 | 0 | 2 | 0 |
| Wild Oats | 2 | 2 | 4 | 2 |
| Alfalfa | 2 | 0 | 4 | 4 |
| Cotton | 4 | 2 | 4 | 4 |
| Peanut | 0 | 0 | 1 | 0 |
| Soybean | 1 | 0 | 4 | 4 |
| Sugar Beets | 4 | 4 | 4 | 4 |
| Tomato | 2 | 0 | 4 | 4 |
| Corn | 1 | 0 | 1 | 1 |
| Grain Sorghum | 1 | 0 | 2 | 0 |
| Rice | 3 | 1 | 4 | 2 |
| Wheat | 4 | 2 | 4 | 2 |

TABLE III

Use of Herbicides on Twenty-four Species

Compound No. 3

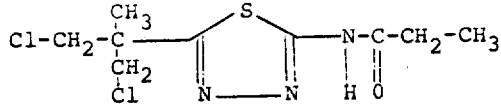

| Plant Species | Pre | | Post | |
|---|---|---|---|---|
| | 3 lb/A | 1 lb/A | 3 lb/A | 1 lb/A |
| Cocklebur | 1 | 0 | 4 | 4 |
| Lambsquarter | 4 | 4 | 4 | 4 |
| Morning Glory | 2 | 1 | 4 | 3 |
| Pigweed | 4 | 4 | 4 | 4 |
| Wild Buckwheat | 4 | 4 | 4 | 4 |
| Wild Mustard | 4 | 4 | 4 | 4 |
| Barnyard Grass | 3 | 3 | 4 | 3 |
| Crabgrass | 4 | 3 | 4 | 2 |
| Downy Brome | 3 | 3 | 4 | 3 |
| Giant Foxtail | 4 | 3 | 4 | 4 |
| Green Foxtail | 4 | 4 | 4 | 4 |
| Nutsedge | 0 | 0 | 0 | 0 |
| Shattercane | 4 | 1 | 4 | 3 |
| Wild Oats | 4 | 1 | 4 | 2 |
| Alfalfa | 4 | 4 | 4 | 4 |
| Cotton | 2 | 2 | 4 | 4 |
| Peanut | 1 | 0 | 1 | 0 |
| Soybean | 1 | 1 | 3 | 1 |
| Sugar Beets | 4 | 4 | 4 | 4 |
| Tomato | 4 | 3 | 4 | 4 |
| Corn | 3 | 1 | 1 | 1 |
| Grain Sorghum | 3 | 1 | 3 | 2 |
| Rice | 4 | 0 | 4 | 1 |
| Wheat | 2 | 1 | 3 | 2 |

We claim:
1. N-(5-Chlorotert.butyl-1,3,4-thiadiazol-2-yl) cyclopropanecarboxamide.
2. N-(5-α,α-Bischloromethylethyl-1,3,4-thiadiazol-2-yl) propionamide.

* * * * *